United States Patent [19]

Kruckenberg et al.

[11] Patent Number: 4,773,915
[45] Date of Patent: Sep. 27, 1988

[54] BENZISOTHIAZOLE AZO DYE FOR SYNTHETIC FIBERS

[75] Inventors: Winfried Kruckenberg; Klaus Leverenz; Hans-Günter Otten, all of Leverkusen, Fed. Rep. of Germany

[73] Assignee: Bayer Aktiengesellschaft, Leverkusen, Fed. Rep. of Germany

[21] Appl. No.: 1,266

[22] Filed: Jan. 7, 1987

Related U.S. Application Data

[62] Division of Ser. No. 750,559, Jun. 27, 1985, Pat. No. 4,681,932.

[30] Foreign Application Priority Data

Jul. 7, 1984 [DE] Fed. Rep. of Germany ....... 3425127

[51] Int. Cl.$^4$ ................ C09B 29/04; C09B 67/48; D06P 1/18; D06P 3/48
[52] U.S. Cl. ......................... 8/691; 8/690; 8/662; 8/922; 8/667; 534/575; 534/753; 534/788
[58] Field of Search .................... 8/691, 690

[56] References Cited

U.S. PATENT DOCUMENTS

| | | | |
|---|---|---|---|
| 3,455,898 | 7/1969 | Seefelder et al. | 534/788 |
| 4,292,239 | 9/1981 | Kruckenberg et al. | 534/788 |
| 4,465,628 | 8/1984 | Grund et al. | 534/788 |
| 4,488,992 | 12/1984 | Yoshinaga et al. | 534/788 |
| 4,681,932 | 7/1987 | Kruckenberg et al. | 534/575 |
| 4,722,737 | 2/1988 | Brandt et al. | 8/526 |

FOREIGN PATENT DOCUMENTS

| | | |
|---|---|---|
| 167913 | 1/1986 | European Pat. Off. . |
| 2222639 | 11/1972 | Fed. Rep. of Germany . |
| 3005865 | 9/1981 | Fed. Rep. of Germany . |
| 2036809 | 7/1980 | United Kingdom . |

*Primary Examiner*—A. Lionel Clingman
*Attorney, Agent, or Firm*—Sprung Horn Kramer & Woods

[57] ABSTRACT

Azo dyestuffs of the formula

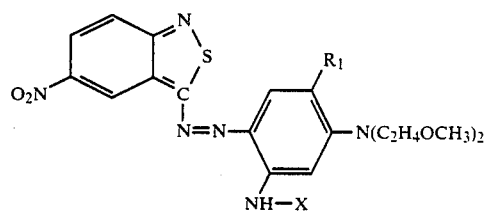

wherein
$R_1$ denotes hydrogen, $C_1$–$C_4$-alkoxy or $C_1$–$C_4$-alkoxyethoxy and
X denotes acyl, are distinguished by good levelling properties and good allround fastness properties. They dye polyester fibres in a bright blue shade.

4 Claims, No Drawings

BENZISOTHIAZOLE AZO DYE FOR SYNTHETIC FIBERS

This is a division of application Ser. No. 750,559, filed June 27, 1985, now U.S. Pat. No. 4,681,932.

The invention relates to a disperse dyestuff of the formula

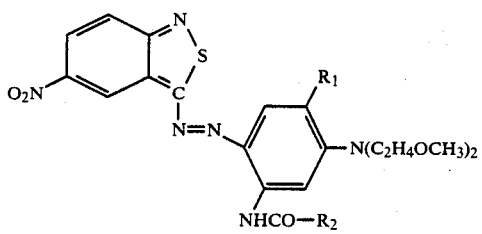

wherein
$R_1$ denotes hydrogen, $C_1$-$C_4$-alkoxy or $C_1$-$C_4$-alkoxyethoxy and
$R_2$ denotes hydrogen, $C_1$-$C_5$-alkyl, $C_1$-$C_5$-alkoxy, $NH_2$, $NH$-$C_1$-$C_5$-alkyl, optionally $CH_3$-, $Cl$-, $OCH_3$- or $OC_2H_5$-substituted phenyls, fur-2-yl, thien-2-yl or 3,4-pyrid-2-yl.

Preferred dyestuffs are those of the formula I wherein $R_1$ denotes hydrogen or $C_1$-$C_2$-alkoxy and $R_2$ denotes $C_1$-$C_4$-alkyl, in particular $C_1$-$C_2$-alkyl.

These dyestuffs are obtained in conventional manner by diazotisation and coupling of appropriate starting materials.

The new dyestuffs have good levelling properties and high resistance to acids, alkali and redox systems and are therefore highly suitable for dyeing on synthetic fibre materials, in particular polyester and cellulose triacetate fibres, which are dyed in a bright, neutral or greenish-blue shade.

The dyes obtained are distinguished by good allround fastness properties and the absence of the catalytic fading effect. Also noteworthy are the very good wet fastness properties of the dyes on polyester/cotton articles.

In comparison with similar dyestuffs as described in DE-A-No. 1,544,375 (=U.S. Pat. No. 3,455,898), there are distinct advantages in affinity and in wet fastness properties.

Compared with the structurally most comparable dyestuffs of DE-A-No. 2,849,471 (=U.S. Pat. No. 4,465,628), the dye-stuffs according to the invention have better build-up properties in the presence of carrier and less temperature-dependent affinity.

It is particularly remarkable that the new azo dyestuffs, in the brightness of their dyeings, come very close to similarly applied but significantly more costly anthraquinone dyestuffs, for example Disperse Blue 56 and Disperse Blue 73.

EXAMPLE 1

149 g of 3-amino-5-nitro-2,1-benzoisothiazole are added at 5° to 8° C. with stirring to a mixture of 350 ml of 96% strength sulphuric acid and 125 ml of 85% strength orthophosphoric acid in the course of about 30 minutes, and the mixture is stirred for a further 30 minutes. 132 ml of nitrosylsulphuric acid are added dropwise at 3° to 5° C. The mixture is subsequently stirred at 3° C. for a total of 3 hours.

The resulting solution of the diazonium salt is then added to a solution of 288.5 g of 3-[bis(2-methoxyethyl)-amino]-acetanilide, 7.5 g of sulphamic acid and 5 g of emulsifier in a mixture of 2 l of water, 4 kg of ice and 168 ml of 48% strength sulphuric acid in the course of about 30 minutes. The coupling is complete after 1 hour.

The dyestuff is then filtered off with suction and washed with water. It dyes polyester fibres in a greenish-blue shade having good allround fastness properties. A solution of the dried dyestuff in dimethylformamide is characterised by λmax: 620 nm.

To prepare a modification which is stable to dyeing, the moist dyestuff presscake is suspended in 6 l of water, and the suspension is neutralised (pH 7.5–8) with about 500 ml of sodium hydroxide solution (40 g of NaOH/100 ml). The suspension is heated with direct steam to 60° C. in the course of an hour and is heat-treated at 60°–70° C. for 4 hours.

When the suspension has cooled down to 50° C., the dyestuff is filtered off again with suction, is washed with water and is dried. The result is 315 g of dyestuff which is characterised by the lattice plane spacings d/Å3.39, 3.49 and 4.18 having the relative intensities 100, 80 and 80 respectively.

EXAMPLE 2

Example 1 is repeated, except that the coupling component is replaced by an equivalent amount of the compound of the formula

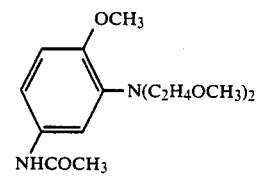

and the pH established during the coupling with dilute NaOH is about pH 2.

The result is likewise a useful dyestuff which produces a blueish-green shade on polyester fibres.

λmax (DMF): 654 nm.

What is claimed is:

1. A process for dyeing synthetic material in a bright, neutral or greenish-blue shade comprising applying to said material a dyestuff of the formula

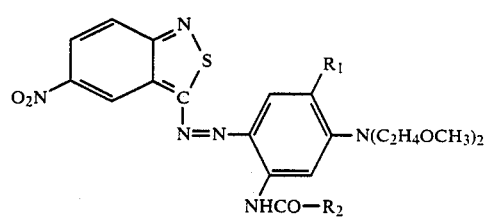

wherein
$R_1$ denotes hydrogen, $C_1$-$C_4$-alkoxy or $C_1$-$C_4$-alkoxyethoxy and
$R_2$ denotes hydrogen, $C_1$-$C_5$-alkyl, $C_1$-$C_5$-alkoxy, $NH_2$, $NH$-$C_1$-$C_5$-alkyl, unsubstituted phenyl or phenyl substituted by $CH_3$, Cl, $OCH_3$ or $OC_2H_5$, fur-2-yl, thien-2-yl or 3,4-pyrid-2-yl.

2. A process according to claim 1 wherein $R_1$ denotes hydrogen or $C_1$–$C_2$-alkoxy and
$R_2$ denotes $C_1$–$C_4$-alkyl.

3. A process according to claim 1 wherein
$R_1$ denotes hydrogen and
$R_2$ denotes methyl.

4. A process according to claim 1 wherein
$R_1$ denotes methoxy and
$R_2$ denotes methyl.

* * * * *